(12) United States Patent
Weidinger et al.

(10) Patent No.: US 9,005,701 B2
(45) Date of Patent: Apr. 14, 2015

(54) METHOD FOR FIRE PROTECTION AND MODIFICATION OF PROPERTIES OF EXPANDED POLYESTERS

(75) Inventors: Jürgen Weidinger, Muenster (DE); Mika Meller, Veikkola (FI); Jie Li, Zofingen (CH)

(73) Assignee: Armacell Enterprise GmbH & Co. KG, Schoenefeld OT Waltersdorf (DE)

( * ) Notice: Subject to any disclaimer, the term of this patent is extended or adjusted under 35 U.S.C. 154(b) by 594 days.

(21) Appl. No.: 12/784,686

(22) Filed: May 21, 2010

(65) Prior Publication Data

US 2011/0171446 A1 Jul. 14, 2011

(30) Foreign Application Priority Data

Jan. 13, 2010 (EP) .................................... 10150608

(51) Int. Cl.
| | | |
|---|---|---|
| B32B 3/26 | (2006.01) | |
| B32B 5/16 | (2006.01) | |
| B32B 5/18 | (2006.01) | |
| B32B 7/00 | (2006.01) | |
| B32B 27/14 | (2006.01) | |
| B32B 27/18 | (2006.01) | |
| B32B 27/36 | (2006.01) | |
| B32B 37/04 | (2006.01) | |
| B32B 37/24 | (2006.01) | |
| B05D 7/02 | (2006.01) | |
| B05D 7/24 | (2006.01) | |
| B05D 1/12 | (2006.01) | |
| B05D 3/02 | (2006.01) | |
| B29C 44/20 | (2006.01) | |
| B29C 44/56 | (2006.01) | |
| C08J 9/36 | (2006.01) | |
| B29C 44/24 | (2006.01) | |
| B32B 27/20 | (2006.01) | |

(52) U.S. Cl.
CPC . *B29C 44/24* (2013.01); *B32B 5/18* (2013.01); *B32B 27/20* (2013.01); *B32B 27/36* (2013.01); *C08J 9/365* (2013.01); *C08J 2367/02* (2013.01); *C08J 2467/00* (2013.01)

(58) Field of Classification Search
None
See application file for complete search history.

(56) References Cited

U.S. PATENT DOCUMENTS 3,615,969 A * 10/1971 Hegg ............................... 156/78
3,676,393 A * 7/1972 Piirma .......................... 524/132

(Continued)

FOREIGN PATENT DOCUMENTS

CH 650196 A5 7/1985
DE 4240285 * 6/1993

(Continued)

OTHER PUBLICATIONS

European Search report from corresponding EP Appln. No. 10150608.7, dated Jun. 14, 2010, 8 pages.

(Continued)

*Primary Examiner* — Vivian Chen
(74) *Attorney, Agent, or Firm* — Rothwell, Figg, Ernst & Manbeck, P.C.

(57) ABSTRACT

The present invention relates to an easy-to-apply, but versatile method for modifying the physical and chemical resistance properties of expanded polyester products, such as fire retardancy and hydrolysis resistance, by melt-modification of the surface layer(s) of said foams and sponges, the manufacturing of such products and the use of such products.

7 Claims, 1 Drawing Sheet

(56) References Cited

U.S. PATENT DOCUMENTS

| | | | | |
|---|---|---|---|---|
| 3,846,524 A | * | 11/1974 | Elmore et al. | 264/45.3 |
| 3,857,914 A | * | 12/1974 | Aishima et al. | 264/45.5 |
| 3,864,181 A | * | 2/1975 | Wolinski et al. | 156/79 |
| 3,877,172 A | * | 4/1975 | Schwab et al. | 47/64 |
| 4,028,158 A | * | 6/1977 | Hipchen et al. | 156/79 |
| 4,119,583 A | * | 10/1978 | Filip et al. | 521/103 |
| 4,280,005 A | * | 7/1981 | Fox | 521/90 |
| 4,288,561 A | * | 9/1981 | Craft et al. | 521/90 |
| 4,322,575 A | * | 3/1982 | Skipper | 174/120 SR |
| 4,351,911 A | * | 9/1982 | Fox | 521/138 |
| 4,459,334 A | * | 7/1984 | Blanpied et al. | 428/219 |
| 4,737,523 A | * | 4/1988 | White et al. | 521/91 |
| 5,000,991 A | * | 3/1991 | Hayashi et al. | 428/36.5 |
| 5,110,844 A | * | 5/1992 | Hayashi et al. | 521/182 |
| 5,128,202 A | * | 7/1992 | Subramanian et al. | 428/318.6 |
| 5,134,028 A | * | 7/1992 | Hayashi et al. | 428/332 |
| 5,288,764 A | * | 2/1994 | Rotter et al. | 521/81 |
| 5,332,620 A | * | 7/1994 | Hayashi et al. | 428/316.6 |
| 5,494,737 A | * | 2/1996 | Sakai et al. | 428/317.9 |
| 5,648,486 A | * | 7/1997 | Cai et al. | 544/124 |
| 5,665,785 A | * | 9/1997 | McClellan et al. | 521/51 |
| 5,783,610 A | * | 7/1998 | Fukushima et al. | 521/51 |
| 5,789,057 A | * | 8/1998 | Naitou et al. | 428/73 |
| 6,025,405 A | * | 2/2000 | Snell Tung et al. | 521/138 |
| 6,033,748 A | * | 3/2000 | Dunning et al. | 428/36.5 |
| 6,054,078 A | * | 4/2000 | Lauer et al. | 264/45.9 |
| 6,066,580 A | * | 5/2000 | Yoshida et al. | 442/221 |
| 6,365,249 B1 | * | 4/2002 | Al Ghatta et al. | 428/36.6 |
| 6,383,608 B1 | * | 5/2002 | Burkett et al. | 428/173 |
| 6,538,050 B1 | * | 3/2003 | Weilandt et al. | 523/219 |
| 6,841,106 B1 | * | 1/2005 | Fujimaki et al. | 264/50 |
| 6,875,484 B1 | * | 4/2005 | Kogure et al. | 428/34.1 |
| 7,157,139 B2 | * | 1/2007 | Salsman et al. | 428/308.4 |
| 7,445,736 B2 | * | 11/2008 | Helber et al. | 264/51 |
| 7,501,175 B2 | * | 3/2009 | Branch et al. | 428/218 |
| 7,585,439 B2 | * | 9/2009 | Branch et al. | 264/50 |
| 7,726,086 B2 | * | 6/2010 | Kalkanoglu | 52/309.8 |
| 7,943,686 B2 | * | 5/2011 | Seidel et al. | 524/117 |
| 2004/0001946 A1 | * | 1/2004 | Ma et al. | 428/317.9 |
| 2005/0151294 A1 | * | 7/2005 | Jeong et al. | 264/165 |
| 2009/0276971 A1 | * | 11/2009 | Nozari | 15/118 |
| 2012/0045602 A1 | * | 2/2012 | Weidinger et al. | 428/36.9 |

FOREIGN PATENT DOCUMENTS

| | | | |
|---|---|---|---|
| DE | 4240285 | A1 | 6/1993 |
| DE | 10117177 | A1 | 10/2002 |
| EP | 0 866 089 | * | 9/1998 |
| EP | 0866089 | A1 | 9/1998 |
| GB | 882296 | | 11/1961 |
| GB | 1161045 | | 8/1969 |
| GB | 2122232 | A | 1/1984 |
| GB | 2222185 | A | 2/1990 |
| GB | 2344834 | A | 6/2000 |
| JP | 624729 | | 1/1987 |
| JP | 1261588 | A | 10/1989 |
| JP | 2215521 | A | 8/1990 |
| JP | 4347252 | A | 12/1992 |
| JP | 5117501 | A | 5/1993 |
| JP | 6170999 | A | 6/1994 |
| JP | 868164 | A | 3/1996 |
| JP | 8151470 | A | 6/1996 |
| JP | 8199709 | A | 8/1996 |
| JP | 10119219 | A | 5/1998 |
| JP | 10-192867 | * | 7/1998 |
| JP | 200677551 | A | 3/2006 |
| JP | 2008201079 | A | 9/2008 |
| KR | 100701274 | B1 | 3/2007 |
| WO | WO 90/10667 | * | 9/1990 |
| WO | 01/51549 | A1 | 7/2001 |

OTHER PUBLICATIONS

M. Xanthos et al.: "Properties and Applications of Sandwich Panels Based on PET Foams," 58th Annual Technical Conference—Society of Plastics Engineers, vol. 2, Jan. 1, 2000, pp. 1886-1890.

Database WPI Week 199429, Thomson Scientific, Long, GB, AN 1994-238205, Jun. 21, 1994, 1 page.

* cited by examiner

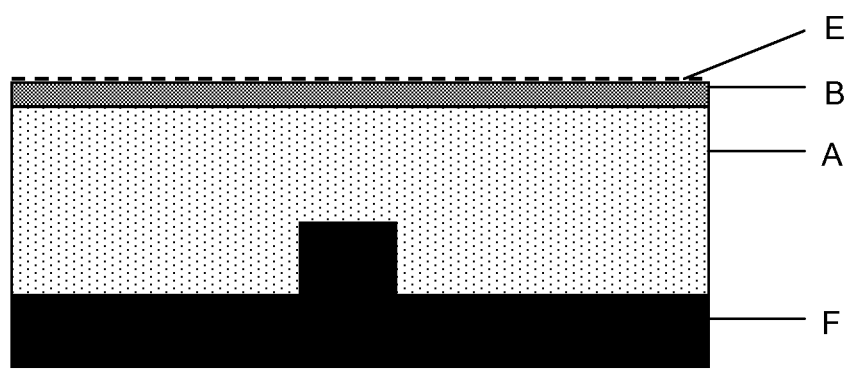

METHOD FOR FIRE PROTECTION AND MODIFICATION OF PROPERTIES OF EXPANDED POLYESTERS

FIELD OF THE INVENTION

The present invention relates to an easy-to-apply, but versatile method for modifying the physical and chemical resistance properties of expanded polyester products, such as fire retardancy and hydrolysis resistance, by melt-modification of the surface layer(s) of said foams and sponges, the manufacturing of such products and the use of such products.

DESCRIPTION OF THE BACKGROUND ART

Expanded polyester polymers, i.e. polyester foam or sponge, are of major importance for a large number of applications related to e.g. insulation against temperature gradients, noise shielding, vibration damping, lightweight construction etc. However, they are basically very sensitive versus decomposition in regard to e.g. hydrolysis or oxygen initiated combustion due to their organic nature caused by the polymer backbone, and due to the fact that hetero atoms having an additional negative effect on stability, such as oxygen, are part of the polymers. What makes the situation even worse is the fact that cellular polyesters are of course weaker than massive material, the surface is much higher, thus, more accessible for aggressive substances, and air/humidity is already available in the cells in case of ignition or alkali or acid attack. Therefore, polyesters basically are easily flammable and tend to continue burning once ignited, and they will continue decomposition by hydrolysis once bond cleavage has taken place. Different efforts have been taken to improve the stability of the polymer compounds themselves, such as the mixing of halogenated and non-halogenated flame retardants, non-combustible fillers etc. into the compound. However, as the manufacturing process of polyester foams is a reactive foaming process (see e.g. EP 0866089, U.S. Pat. No. 5,288,764, JP 5117501, JP 62004729, WO 2001051549; JP 8151470 mentions recycled material made to foam) foreign substances may severely impact the expansion or foaming of the polymers as well as other final properties targeted for the intended applications. Additionally, these foreign substances would have to withstand the processing conditions which might be e.g. almost 300° C. when speaking about polyethylene terephthalate. Most of the standard flame retardant agents would not survive these temperatures and decompose during the process. Other, more stable substances such as inorganic fillers, fibres etc., either will negatively influence the chain length of the polymers or the cell structure or simply can not be compounded into the matrix to an extent where a significant effect could be achieved. To overcome these issues some works have been done on the field of coating and lamination technologies where the restriction provided by the processing of the expanded polyester is not given. KR 100701274 discloses a polyethylene terephthalate (PET) carpet layer with phosphorous as flame retardant. In JP 2008201079, JP 10119219, JP 8068164, JP 1261588, GB 2344834, GB1161045, GB 882296 and U.S. Pat. No. 6,066,580 polyester, polyester fibre or polyester/glass fibre lamination is used to protect the more flammable foam core consisting of other polymers; GB 2222185 claims this system as a kind of "melt-away" fire protection; GB 2122232 is discussing a treatment of foam or its protective layers with halogen/antimony compounds. JP 2006077551 among others is dealing with polyester fibres as an internal flame protection, but covered by a metal foil and using adhesives to bond the layers together. The metal, mainly aluminium, foil indeed is a rather widespread method, see e.g. in JP 2215521, JP 4347252, JP 8199709, U.S. Pat. No. 4,459,334, CH 650196 etc. However, these multilayer methods bear some source for failure, such as the additional uncertainties provided by the necessary adhesive (flammability, durability, compatibility etc.). DE 10117177 mentions a PET foam window sill where the surface is closed for decorative purposes by melting it, but no other measures or benefits are provided, same for JP 6170999 where a polyester (namely PET) layer is coextruded on a polyester foam core for providing a thermoformable board. The possibilities of the combinations of some of the a.m. methods are not thoroughly understood, though. This, however, is essential for developing materials that will be able to fulfil nowadays requirements concerning approvals: e.g. flammability test related certifications within the building industry become more and more global, but also more precise and application-related and therefore more challenging (e.g. ASTM E-84 "tunnel burn test", UL 94 "horizontal/vertical burn", EN 13823 "round corner burn test", FM "room burn test").

SUMMARY OF THE INVENTION

A major object of the present invention thus is to provide an expanded polyester material and related process for manufacturing the same being easy to handle and leading to a compound that is versatile, reliable and easy to apply, being flame retardant and stable against hydrolytic decomposition, all that without loosing any of the beneficial properties of polyester, namely polyalkylidene terephthalate, foams, such as economy, low density, high $T_g$, controlled crystallinity etc.

BRIEF DESCRIPTION OF THE DRAWINGS

FIG. 1 schematically shows a material according to one embodiment.

DETAILED DESCRIPTION OF THE INVENTION

Surprisingly, it is found that such a material not showing the above mentioned disadvantages can be achieved by putting a protective and functionalized layer on the expanded polyester by a coating or laminate that is mainly comprised of the respective polyester polymer itself as a matrix, enriched with additives. This not only facilitates the bonding of the layer onto the cellular substrate, but also significantly enlarges the freedom to practice concerning the modification of the functional layer in regard to flame protection and against chemical and physical attack as well as concerning its general properties, which is discussed in detail below. By this method, a significant enrichment of chemical substances such as flame retardant agents and/or anti-hydrolysis agents is provided where it is necessary, i.e. on the surface, where physical or chemical attack primarily will occur and where it can be controlled and even be stopped best possible.

The claimed material contains compound (A), see FIG. 1, which is an expanded polyester based compound. The expanded polyester may show an open or closed cell structure (i.e. may be a sponge or foam) of any cell size and distribution. Preferred are polyalkylidene terephthalate polymer foams, especially preferred such based on polyethylene terephthalate (PET). The compound (A) may contain other ingredients other than the polyester polymer itself, such as, but not exclusively: fillers, other polymers (thermoplasts, thermosets, TPEs, elastomers), fibres, additives, colours, crosslinkers, ceramifying or char-forming agents, intumescent systems, stabilizers, flame retardant agents etc.

The claimed material contains at least one outer layer (B) comprising or consisting of a massive, thus unexpanded, polyester matrix, preferably based on PET, especially preferred is recycled PET due to economic and ecologic reasons, but also due to the fact that post-consumer PET has a lower melting point as well as lower melt viscosity which is of advantage for the invention. In certain embodiments, the unexpanded polyester contains a low to high concentration of functional additives. In certain embodiments, the outer layer is additivated with functional chemicals from 0.5 to 60 weigh-percent. The morphology and properties of the PET for (B) will allow to easily compound (i.e. mix) it with various substances or additives, such as flame retardants (C) and/or hydrolysis preventing chemicals (D). This mixing can be done in "dry" state, means at low temperatures, e.g. in a standard mixer, to provide an only mechanically mixed compound. This is favourable when the additives are temperature-sensitive, as they will then only be loaded once with temperature when (B) is being applied on (A) (see below). In all other cases the additives can be compounded into the PET in melt state, e.g. in a compounding extruder, to achieve a physical mixture or solution. The layer (B) is melt onto (A) to achieve an excellent bonding. This can be done by various methods, such as, but not exclusively, coextrusion, co-moulding or overmoulding, lamination, all of which can be done with pre-fabricated sheet of (B) or powder, or spraying and sintering of powder/flakes or granulate etc., in on-line or off-line processes, continuously or discontinuously. Preferred is process where (B) is brought onto (A) in powder form and then melt onto or into (A), respectively, by applying temperature and slight pressure, such as by use of a hot plate or preferably a moving hot belt or hot cylinder(s). Especially preferred is such accelerated sintering process applied on-line after foam extrusion, preferably continuous. Compound (B) may contain additional ingredients other than the polyester polymer and the mentioned additives, such as, but not exclusively: fillers, other polymers (thermoplasts, thermosets, TPEs, elastomers), fibres, colours, crosslinkers, expansion agents, stabilizers etc. to provide modified and/or additional performances to the material. If the part provided by (A) is planar then the coating (B) is applied on at least one side of the part.

The compound (B) of the claimed material furthermore may contain additives (C) for fire retardancy which may be chosen from class such as, but not exclusively, halogen containing substances, phosphorous compounds, water releasing chemicals, self-ceramifying, char-forming or intumescent substances, and mixtures thereof. Preferred are non-halogen compounds, especially preferred are phosphorous compounds, such as, but not exclusively, (poly)phosphorous esters, red phosphorous, (poly)phosphates, -phosphonates and -phoshinates, due to their stability under processing conditions and their compatibility with the polyester matrix, and due to their char-forming potential. The additives (C) can be compounded into the layer (B) to a very high extent (up to >50 weight-% depending on the substance), which would not be feasible in the foam (A), where the maximum dosage of such chemicals is around 5% by experience, and would additionally be decreased relative to the surface to be protected by the process of foaming itself.

The compound (B) of the claimed material may contain additives (D) for preventing hydrolytic bond cleavage, such as, but not exclusively, salts, buffers, water/moisture scavengers or absorbents, and mixtures thereof. Preferred are substances that are stable under the given conditions, such as inorganic absorbents and buffer systems, especially preferred are phosphorous systems based on (poly)phosphorous acid, its anhydride(s) and its salts due to their stability, their wide performance range and compatibility with both the matrix of (B) and with (C). The additives (D) can be compounded into the layer (B) to a very high extent (up to >50 weight-% depending on the substance), which would not be feasible in the foam (A).

The claimed material furthermore may contain additional functional layers (E), comprising or consisting of e.g. metal, fibres or plastics, as covering on (B) to act e.g. as a shielding, a reinforcing or as a decorative layer, see FIG. 1. Preferred are layers that will either be flame-retardant themselves, or intumescent and/or char-forming or easily be burning or melting away so not to disturb the functioning of the (A) (B) flame retardancy system. The compounds (E) may be bond to (B) by adhesives, preferably flame retardant ones, or adhere by themselves.

The claimed material furthermore may contain any further element (F) necessary for the intended application, such as, but not exclusively, parts made from wood, glass, metal or concrete etc., structures for building purposes etc., see FIG. 1. The compounds (F) may be bond to other compounds of the material by adhesives, preferably flame retardant ones, or adhere by themselves.

A major advantage of the claimed material is the fact that its manufacturing process will allow to enclose a broad variety of substances in high concentration into the outer layer, such as flame retardants that will render this layer extremely difficult to ignite or burn through, and therefore will allow to generate properties that would never be achievable by additivation of the foam only.

This leads to another prominent advantage of the claimed material which is the fact that the developer and the process responsible can independently focus on optimization of the protective layer or the expanded core, their performance and their manufacturing, as the materials' properties and requirements are decoupled, which is not the case with expanded material that has been tried to be additivated directly.

This is linked to a further advantage of the claimed material which is the possibility to adapt its properties to the desired property profile (concerning mechanics, damping, insulation, flexibility, etc.) by possible independent modification of the core (A) and/or the layer (B) concerning respective thickness, loading with additives, crystallinity etc.

Another major advantage of the claimed material is the fact that the base material for the functional layer can be recycled material.

A very prominent advantage of the claimed material is the fact that the surface is completely closed and homogeneous, no matter if the foam core showed open cells or voids or the like before coating.

A further prominent advantage of the claimed material is the fact that (B) will show excellent adhesion to (A) without any further measures and that the resulting composite will act as "one" material.

It is a further advantage of the claimed material that the level of penetration of the outer layer (B) into the cell structure of (A) can be easily influenced during the manufacturing process by altering the temperature of the surface of (A) in combination with the temperature of (B) and the pressure being applied.

A further advantage of the claimed material is the fact that due to the compounding and application process for (B) there is neither danger of demixing of important ingredients in (B) nor any negative impact on the core foam.

Another advantage of the claimed material is the fact that no additives have to be put into the major volume of the final part, i.e. the foam, leading to a more "clean" product This leads to another advantage of the claimed material as it is recycling-friendly due to the fact that pure polyester is obtained after removal of the top layer. Even the top layer recyclate may be used for similar purposes again.

A basic advantage of the claimed material is the fact that in its preferred compositions it is free of both fibres, brominated substances and PVC, all of them being under survey and being discussed for environmental and health issues.

A further advantage of the claimed material is that its flame retardant properties are almost independent from the geometry of the part to be fire protected.

It is a prominent advantage of the claimed material that it can be produced in an economic way in a continuous process, e.g. by extrusion and co-lamination as discussed above. It shows versatility in possibilities of manufacturing and application. It can be extruded, co-extruded, laminated, moulded, co-moulded, overmoulded, welded etc. directly as a multi-layer system and thus it can be applied in unrestricted shaping onto various surfaces in automotive, transport, aeronautics, building and construction, furniture, machinery engineering and many other industries, even by a thermoforming or other shaping methods following the manufacturing process of the material. The additional layer even will improve thermoforming as well as other processing properties (e.g. printability, fixing and mounting etc.).

It is a further advantage of the claimed material that it can be transformed and given shape by standard methods being known in the industry and that it does not require specialized equipment.

A further advantage of the claimed material is its suitability for thermal and sound/vibration insulation applications, e.g. in building industry, as the PET foam is known to be a very high strength material ideal for this kind of application where structural support is desired. Layer (B) here can act as a vapour barrier and water repellent surface.

EXAMPLES

In the following examples and comparative examples standard PET insulation foam (ArmaStruct®, Armacell GmbH, Munster, Germany) of 65 kg/m$^3$ density was cut to 25 mm thickness and 500 mm width samples. The protective layers were put on the foam parts by homogeneously distributing them in powder masterbatch form onto the foam surface using a flat die/racle system and then slowly running the prepared part under a hot (280° C.) chromium plated cylinder of 600 mm width and 200 mm radius, applying slight and constant pressure (compression factor relative to the foam thickness <0.5%).

The PET for the coating layer was either ground from virgin PET (Sabic, Genk, Belgium), from recycled scrap after internal manufacturing (Armacell) or from recyclate flakes bought on the market.

The powder for the coating was prepared either by mixing the respective additives and the PET powder in the cold state in a stirring mixer or by melting the PET in a mixing extruder and adding the additives into the melt, followed by re-granulation of the obtained masterbatch. Table 1 is providing data for powder masterbatches and used ingredients (flame retardants).

TABLE 1

Ingredients of powder masterbatches

| Masterbatch | PET type | FR additive and dosage in Masterb. | Supplier |
|---|---|---|---|
| 1 | Virgin | 40% Firebrake ® 500 (Borate) | Borax Europe ltd., Guildford, UK |
| 2 | Virgin | 40% Melapur ® 200 (Melamine) | Ciba, Grenzach, Germany |
| 3 | Virgin | 50% Exolit ® OP 1200 (Phosphorous) | Clariant, Muttenz, Switzerland |
| 4 | Virgin | 60% Saytex ® 8010 (Brominated) | Albemarle, Louvain, Belgium |
| 1A | Recycled (Armacell) | 40% Firebrake ® 500 (Borate) | Borax Europe ltd., Guildford, UK |
| 2A | Recycled (Armacell) | 40% Melapur ® 200 (Melamine) | Ciba, Grenzach, Germany |
| 3A | Recycled (Armacell) | 50% Exolit ® OP 1200 (Phosphorous) | Clariant, Muttenz, Switzerland |
| 4A | Recycled (Armacell) | 60% Saytex ® 8010 (Brominated) | Albemarle, Louvain, Belgium |
| 1R | Recycled (free market) | 40% Firebrake ® 500 (Borate) | Borax Europe ltd., Guildford, UK |
| 2R | Recycled (free market) | 40% Melapur ® 200 (Melamine) | Ciba, Grenzach, Germany |
| 3R | Recycled (free market) | 50% Exolit ® OP 1200 (Phosphorous) | Clariant, Muttenz, Switzerland |
| 4R | Recycled (free market) | 60% Saytex ® 8010 (Brominated) | Albemarle, Louvain, Belgium |
| 5R | Recycled (free market) | 30% alumina trihydrate, 20% Saytex ® 8010 | Albemarle; Bergheim, Germany |

The manufactured composites were partially examined for fire retardant behaviour according to EN 13823/EN 13501-1 (single burning item/round corner test), DIN 4102, and UL 94 (horizontal/vertical burn). Table 2 shows the results in comparison with untreated foam board of same thickness (comparative example, marked with asterisk). The examples without asterisks comprise claimed material.

TABLE 2

Flammability test results

| Masterbatch | EN 13823/ 13501-1 | DIN 4102 | UL94 -coating on one side/ two sides | Evaluation |
|---|---|---|---|---|
| none* | E | fail | fail | Extremely flammable |
| 1 | D | fail | HB | Flammable |
| 2 | C S3 d0 | B1 | V-2/V-1 | Flame-retardant |
| 3 | B S3 d1 | B1 | V-1/V-0 | Very flame-retardant |
| 4 | C S3 d1 | B2 | V-2/V-1 | Flame-retardant |
| 1A | D | fail | HB | Flammable |
| 2A | C S3 d0 | B1 | V-2/V-2 | Flame-retardant |
| 3A | B S3 d1 | B1 | V-1/V-0 | Very flame-retardant |
| 4A | C S3 d1 | B2 | V-2/V-2 | Flame-retardant |
| 1R | n.e. | fail | HB | Flammable |
| 2R | n.e. | n.e. | V-2/V-1 | Flame-retardant |
| 3R | B S3 d1 | B1 | V-1/V-0 | Very flame-retardant |
| 4R | n.e. | n.e. | HB/V-2 | Flame-retardant |
| 5R | B S3 d0 | B1 | V-1/V-0 | Very flame-retardant |

(n.e.: not examined)

We claim:

1. A process for manufacturing a material consisting of a layer (A) and a layer (B) applied thereon to cover said layer (A), said layer (A) being an expanded polyester core being covered with said layer (B) as an outer protective layer, said layer (B) being unexpanded polyester containing functional additives in an amount for providing protection of said material from at least one of physical attack or chemical attack, wherein the outer protective layer is comprised of a polyalkylidene terephthalate and at least one flame retardant agent in an amount from 30 to 60 weight-percent and at least one anti-hydrolysis agent, the process comprising a continuous on-line extrusion of layer (A) and coating layer (B) onto layer (A) using a powder melt coating process, wherein the powder melt coating process comprises recycled polyalkylidene terephthalate as a base material.

2. The process according to claim 1, wherein the core is comprised of a polyalkylidene terephthalate.

3. The process according to claim 1, wherein both the core and the outer layer are comprised of a polyalkylidene terephthalate.

4. The process according to claim 1, wherein the flame retardant agents and the anti-hydrolysis agents are phosphorous based.

5. The process according to claim 1, further comprising adapting said material for suitable use in at least one of thermal insulation, acoustic insulation, acoustic damping or vibration damping.

6. The process according to claim 1, further comprising adapting said material for suitable use in at least one of thermal insulation, or sound insulation, at least one of inside or outside of structures, vessels, containers, pipes, walls, ceilings, floors, roofs, tanks, tubes, or ducts.

7. A process for manufacturing a material consisting of a layer (A) and a layer (B) applied thereon to cover said layer (A), said layer (A) being an expanded polyester core being covered with said layer (B) as an outer protective layer, said layer (B) being unexpanded polyester containing functional additives in an amount for providing protection of said material from at least one of physical attack or chemical attack, wherein the outer protective layer is comprised of a polyalkylidene terephthalate and at least one flame retardant agent in an amount from 30 to 60 weight-percent and at least one anti-hydrolysis agent, the process comprising laminating layer (B) onto layer (A) by a powder melt process whereby the powder is melted and applied by direct heating by at least one rotating cylinder, at least one moving belt or a combination thereof.

* * * * *